(No Model.)
M. & J. P. McINNES.
GANG PLOW.
No. 393,074. Patented Nov. 20, 1888.
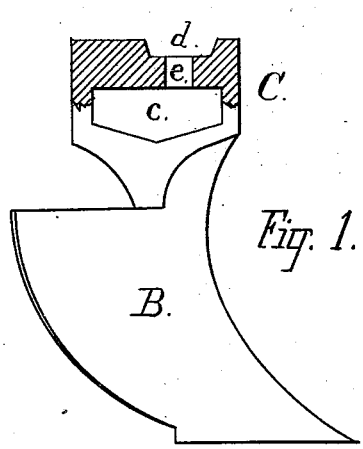
Fig. 1.
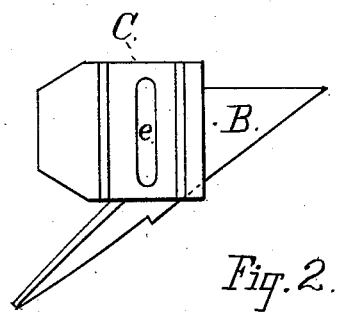
Fig. 2.
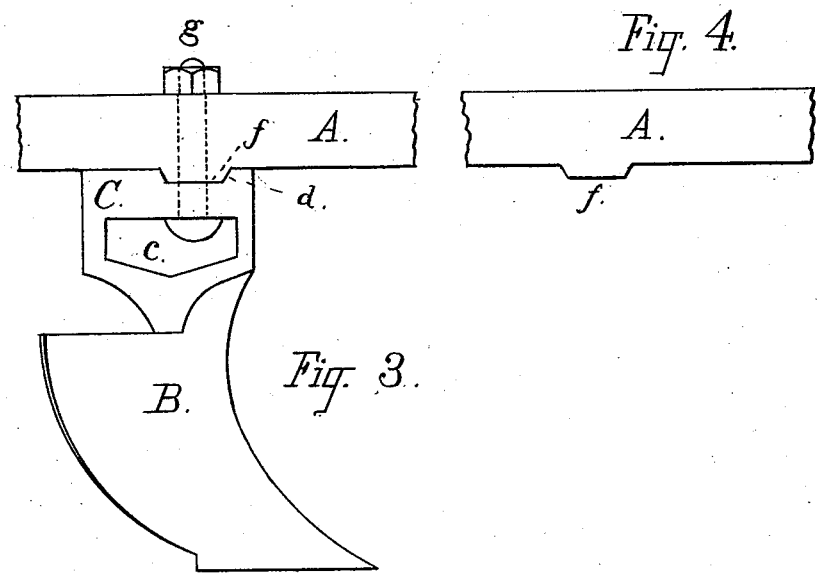
Attest:
H. W. Brown.
Wesley Royce.
Inventor:
Malcolm McInnes.
John P. McInnes.
By Almon Hall,
Their Atty.

UNITED STATES PATENT OFFICE.

MALCOLM McINNES AND JOHN P. McINNES, OF TOLEDO, OHIO.

GANG-PLOW.

SPECIFICATION forming part of Letters Patent No. 393,074, dated November 20, 1888.

Application filed July 11, 1887. Serial No. 243,960. (No model.)

*To all whom it may concern:*

Be it known that we, MALCOLM McINNES and JOHN P. McINNES, citizens of Great Britain, residing at Toledo, Lucas county, Ohio, have invented certain new and useful Improvements in Gang-Plows, of which the following is a specification.

Our invention relates to and its object is to provide means for adjusting the several plows of a gang laterally, so as to regulate the width of the furrows.

Our invention is applicable to and is designed as an improvement upon gang-plows of the class shown and described in United States Letters Patent issued to Thomas Richardson and Malcolm McInnes, May 9, 1876, numbered 177,088.

Our device is illustrated in the accompanying drawings, made part hereof, in which—

Figure 1 is a side elevation of one of our plows, partly in vertical section; Fig. 2, a plan of the same; Fig. 3, an elevation of same attached and in place, and Fig. 4 part of our plow beam or rail.

A is one of the rails or beams of the frame to which a plow of the gang is attached.

B is the plow, having instead of the standard or shank, by which plows are usually attached to their beam, a nearly square head, C, through which is a horizontal opening, $c$, from side to side. The upper face of head C has a recess, $d$, extending across the same from side to side. In the bottom of recess $d$ is a slot, $e$, extending through and into opening $c$ and nearly across head C.

Rail or beam A is provided on its under side with a cross-projection, $f$, which coincides with and fits into recess $a$, the two forming a sort of dovetail joint. A bolt, $g$, with its head in opening $c$, passes up through slot $e$ and through a hole in rail A, and is provided with a thread and nut on its upper end. This nut being loosened the plow may be slipped to the right or left to the extent of the length of slot $e$, and the relative positions of the plows in the gang may be thus laterally adjusted and the width of the several furrows fixed. When the nut $g$ is tightened, any play or looseness of the plow on its rail or beam is prevented by the close cross-joint $d\, f$.

It will be understood that in a gang of three or other odd number of plows the middle one need not be adjustable laterally.

What we claim as our invention, and desire to secure by Letters Patent, is—

Plow B, having head C, provided with opening $c$, slot $e$, and recess $d$, in combination with beam A, having projection $f$, and screw-bolt $g$, substantially as shown and described, for the purpose specified.

MALCOLM McINNES.
JOHN P. McINNES.

Witnesses:
CHAS. RHIESSINGER,
FRANK J. SCOTT.